US008728275B2

(12) United States Patent
Li et al.

(10) Patent No.: US 8,728,275 B2
(45) Date of Patent: May 20, 2014

(54) GLYCEROL-BASED POLYMERS FOR REDUCING DEPOSITION OF ORGANIC CONTAMINANTS IN PAPERMAKING PROCESSES

(75) Inventors: Xiaojin Harry Li, Palatine, IL (US); Paul F. Richardson, Pittsburgh, PA (US); Sergey M. Shevchenko, Aurora, IL (US)

(73) Assignee: Ecolab USA Inc., Naperville, IL (US)

( * ) Notice: Subject to any disclaimer, the term of this patent is extended or adjusted under 35 U.S.C. 154(b) by 0 days.

(21) Appl. No.: 13/560,771

(22) Filed: Jul. 27, 2012

(65) Prior Publication Data

US 2014/0027079 A1 Jan. 30, 2014

(51) Int. Cl.
| | | |
|---|---|---|
| D21H 21/02 | (2006.01) | |
| D21H 17/53 | (2006.01) | |
| D21H 23/00 | (2006.01) | |
| D21H 23/04 | (2006.01) | |
| C08G 65/00 | (2006.01) | |
| C08G 65/34 | (2006.01) | |

(52) U.S. Cl.
USPC ........ 162/164.1; 162/158; 162/185; 568/579; 568/679; 568/680

(58) Field of Classification Search
USPC .................. 162/158, 164.7, 164.1, 175, 185; 568/579, 672, 678–680
See application file for complete search history.

(56) References Cited

U.S. PATENT DOCUMENTS

| | | | |
|---|---|---|---|
| 2,613,704 A | 10/1952 | Sacrey | |
| 3,637,774 A | 1/1972 | Babayan et al. | |
| 4,968,448 A * | 11/1990 | Svarz | 516/133 |
| 5,057,570 A | 10/1991 | Miller et al. | |
| 5,091,159 A | 2/1992 | Connelly et al. | |
| 5,198,532 A | 3/1993 | Blytas et al. | |
| 5,250,152 A | 10/1993 | Ling et al. | |
| 5,326,499 A * | 7/1994 | Wegner et al. | 516/133 |
| 5,429,718 A * | 7/1995 | Morlino et al. | 162/72 |
| 5,501,769 A | 3/1996 | Blackstone et al. | |
| 5,630,985 A | 5/1997 | Williams et al. | |
| 5,716,530 A | 2/1998 | Strominger et al. | |
| 6,030,443 A | 2/2000 | Bock et al. | |
| 6,086,771 A | 7/2000 | Selvarajan et al. | |
| 6,133,215 A | 10/2000 | Zelger et al. | |
| 6,228,416 B1 | 5/2001 | Reibert et al. | |
| 6,620,904 B2 * | 9/2003 | Lemke | 528/295.5 |
| 6,765,082 B2 | 7/2004 | Sunder et al. | |
| 8,101,045 B2 * | 1/2012 | Furman et al. | 162/112 |

(Continued)

FOREIGN PATENT DOCUMENTS

| | | |
|---|---|---|
| DE | 10307172 | 5/2005 |
| WO | 96/41915 A1 | 12/1996 |

(Continued)

OTHER PUBLICATIONS

Markova, D. et al., "Synthesis of novel poly(vinyl methyl ether) copolymers by alkylation of poly(vinyl acetate) and poly(vinyl alcohol)," Polymer International, 2003, 52, pp. 1600-1604.
Kildea, John D.; Thomas, Anna. "Scale Control and Prevention of Hydrate Precipitation in Red Mud Filters", Light Metals (2000), 105-110.

(Continued)

*Primary Examiner* — Dennis Cordray
(74) *Attorney, Agent, or Firm* — Benjamin E. Carlsen (57) ABSTRACT

Described herein are methods of reducing the deposition of organic contaminants, such as pitch and stickies, in papermaking processes.

18 Claims, 5 Drawing Sheets

(56) References Cited

U.S. PATENT DOCUMENTS

| | | | |
|---|---|---|---|
| 2003/0124710 A1* | 7/2003 | Borch et al. | 435/262 |
| 2006/0286052 A1 | 12/2006 | Oki et al. | |
| 2008/0306211 A1 | 12/2008 | Lemke et al. | |
| 2010/0212847 A1* | 8/2010 | Hamers et al. | 162/75 |
| 2011/0092743 A1* | 4/2011 | Li et al. | 568/679 |
| 2012/0238776 A1 | 9/2012 | Li et al. | |

FOREIGN PATENT DOCUMENTS

| | | |
|---|---|---|
| WO | 99/20828 A1 | 4/1999 |
| WO | 99/29696 A1 | 6/1999 |
| WO | 2006/033321 A1 | 3/2006 |

OTHER PUBLICATIONS

Coyne, John F., et al., "Adsorption of Hydroxyl Organic Compounds on Alumina Trihydrate", Light Metals (1994), 39-45.

Rossiter, D.S., et al., "The Mechanism of Sodium Gluconate Poisoning of Gibbsite Precipitation", Chemical Engineering Research and Design (1996), 74(A7), 828-834.

Sunder et al, "Controlled Synthesis of Hyperbranched Polyglycerols by Ring-Opening Multibranching Polymerization", Macromolecules (1999), 32, 4240-4246.

Sunder et al., "Chiral Hyperbranched Dendron-Analogs", Macromolecules (2000), 33, 253-254.

* cited by examiner

GLYCEROL-BASED POLYMERS FOR REDUCING DEPOSITION OF ORGANIC CONTAMINANTS IN PAPERMAKING PROCESSES

FIELD OF THE INVENTION

The present invention relates to methods of reducing the deposition of organic contaminants, such as pitch and stickies, in papermaking processes.

BACKGROUND OF THE INVENTION

The deposition of organic contaminants on process equipment, screens, and containment vessels in papermaking can significantly reduce process efficiency and paper quality. Deposits on machine wires, felts, foils, headbox surfaces, screens, and instruments can result in costly downtime for cleaning to avoid the problems associated with poor process control, reduced throughput, and substandard sheet properties. Such contaminants are generically referred to in the paper industry as either "pitch" or "stickies". Pitch deposits generally originate from natural resins present in virgin pulp, including terpene hydrocarbons, rosin/fatty acids or salts thereof, such as pimaric acid, pinic acid and abietic acid, glyceryl esters of fatty acid, sterols, etc. Stickies and white pitch generally refers to the hydrophobic substances used in the manufacture of paper such as sizing agents, coating binders, and pressure sensitive or contact adhesives. Such substances can form deposits when reintroduced in recycled fiber systems. Other common organic contaminants that are chemically similar to stickies and found in recycle applications include wax, which originates primarily from wax-coated old corrugated containers, and polyisoprene. Pitch and stickies may also contain entrapped inorganic materials such as talc, calcium carbonate, or titanium dioxide.

Recycled fiber also refers to secondary fibers which are repulped to provide the papermaking furnish with raw material for the production of new papers. The secondary fibers may be either pre-consumer or post-consumer paper material that is suitable for use in the production of paper products. Sources of secondary fiber may include old newspaper (ONP), old corrugated containers (OCC), mixed office waste (MOW), computer printout (CPO), ledger, etc. These once-processed papers contain various types of adhesives (pressure sensitive, hot melts, etc.), inks, and coating binders.

Pitch and stickies are hydrophobic in nature and thus unstable as colloids in aqueous papermaking environments, thereby facilitating their deposition. The major problems arising from deposition are as follows: (1) reduced throughput due to plugging of forming fabrics and press felts (2) sheet holes or paper breaks due to large deposits breaking loose from the equipment, and (3) reduced sheet quality due to large particle contaminants incorporated in the final sheet.

Surfactant additives are often used to disperse pitch and stickies, but current products have limitations. For example, cationic polymer dispersants can be easily attracted to fiber surfaces, which may reduce their effectiveness, and they may further interfere with the charge dynamics of fibers, which may lower the effectiveness of other additives such as strength agents. Anionic polymer dispersants may cause precipitation problems with wet strength agents or inorganic components. Nonionic surfactants such as nonylphenol ethoxylates may cause foaming issues which can upset the system. Accordingly, improved methodologies for controlling contaminant deposition in the papermaking process are needed.

SUMMARY OF THE INVENTION

The present invention is directed to methods for controlling, reducing or eliminating the deposition of organic contaminants in a papermaking process.

In one aspect, the invention provides a method of reducing the deposition of contaminants in a papermaking process, comprising adding to pulp or a papermaking system an effective amount of a branched, cyclic glycerol-based polymer. In some embodiments, the branched, cyclic glycerol-based polymer is a lipohydrophilic glycerol-based polymer. In some embodiments, the branched, cyclic glycerol-based polymer is cross-linked. In some embodiments, the branched, cyclic glycerol-based polymer is a random polymer of the monomeric units indicated in the following formula:

wherein:

m, n, o, p, q and r are independently 0 to 700;

R and R' are independently —$(CH_2)_x$—, wherein each x is independently 0 or 1; and each $R_1$ is independently selected from hydrogen, acyl and $C_1$-$C_{50}$ alkyl.

In some embodiments, each $R_1$ is independently selected from hydrogen, $C_6$-$C_{18}$ alkyl, and —C(O)CH(OH)$CH_3$. In some embodiments, each $R_1$ is independently selected from hydrogen, $C_{10}$-$C_{16}$ alkyl, and —C(O)CH(OH)$CH_3$. In some embodiments, m, n, o, p, q and r are independently selected from 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50. In some embodiments, the branched, cyclic glycerol-based polymer has a weight-average molecular weight of about 1,000 Da to about 500,000 Da.

In some embodiments, the method further comprises adding to the pulp or the papermaking system at least one component selected from the group consisting of fixatives, detackifiers, and other dispersants.

In some embodiments, the organic contaminants are hydrophobic contaminants. In some embodiments, the hydrophobic contaminants are stickies deposits. In some embodiments, the hydrophobic contaminants are pitch deposits. In some embodiments, the hydrophobic contaminants are white pitch deposits.

In some embodiments, the branched, cyclic glycerol-based polymer is added to a pulp slurry in a pulper, latency chest, reject refiner chest, disk filter or Decker feed or accept, whitewater system, pulp stock storage chest, blend chest, machine chest, headbox, saveall chest, or any combination thereof in the papermaking process. In some embodiments, the branched, cyclic glycerol-based polymer is added to a surface in the papermaking process selected from a pipe wall, a chest wall, a machine wire, a press roll, a felt, a foil, an Uhle box, a dryer, or any combination thereof. In some embodiments, the branched, cyclic glycerol-based polymer is added to a pulp slurry in the papermaking process. In some embodiments, the effective amount of the branched, cyclic glycerol-based polymer is from about 5 ppm to about 300 ppm. In some embodiments, the effective amount of the branched, cyclic glycerol-based polymer is from about 50 ppm to about 200 ppm. In some embodiments, the effective amount of the branched, cyclic glycerol-based polymer is about 100 ppm.

In another aspect, the invention provides a method of reducing the deposition of organic contaminants in a papermaking process, comprising adding to pulp or a papermaking system a branched, cyclic glycerol-based polymer at an amount 5 ppm or above.

DETAILED DESCRIPTION

Described herein are methods for controlling, reducing or eliminating the deposition of contaminants in a papermaking process. The method includes the step of adding to the papermaking process an effective amount of a branched, cyclic glycerol-based polymer such as one illustrated in FIG. 1. The inventors have discovered that adding a branched, cyclic glycerol-based polymer to a papermaking process can effectively decrease hydrophobic contaminant deposition at lower doses than current products. Both ester and alkyl ether functionalities of the branched, cyclic polyglycerol may result in strong lipophilic interactions with pitch and stickies in a flow of contaminated pulp slurry. The hydrophilic portion of the alkylated, branched, cyclic polyglycerol esters provides for dispersion of the pitch and stickies particles in water. The branching and cyclic structures in the backbone of the polymer may increase the polymer dimensions for the effective interactions to disperse organic deposits. These branched, cyclic glycerol-based polymers lack some of the disadvantages associated with current products such as cationic and anionic surfactants, as well as nonionic surfactants that cause foaming problems.

1. DEFINITIONS

The terminology used herein is for the purpose of describing particular embodiments only and is not intended to be limiting. As used in the specification and the appended claims, the singular forms "a," "and" and "the" include plural references unless the context clearly dictates otherwise.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

"Acyl" as used herein refers to a substituent having the general formula —C(O)R, wherein R is alkyl, alkenyl, alkynyl, aryl, heteroaryl or heterocyclyl, any of which may be further substituted "Alkyl" as used herein refers a linear, branched, or cyclic saturated hydrocarbon group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like. Alkyl groups may be optionally substituted.

As used herein, the term "branched" refers to a polymer having branch points that connect three or more chain segments. The degree of branching may be determined by $^{13}C$ NMR based on a known literature method described in *Macromolecules*, 1999, 32, 4240. As used herein, a branched polymer includes hyperbranched and dendritic polymers.

"Cyclic" means a polymer having cyclic or ring structures. The cyclic structure units can be formed by intramolecular cyclization or any other ways.

Figure 1:
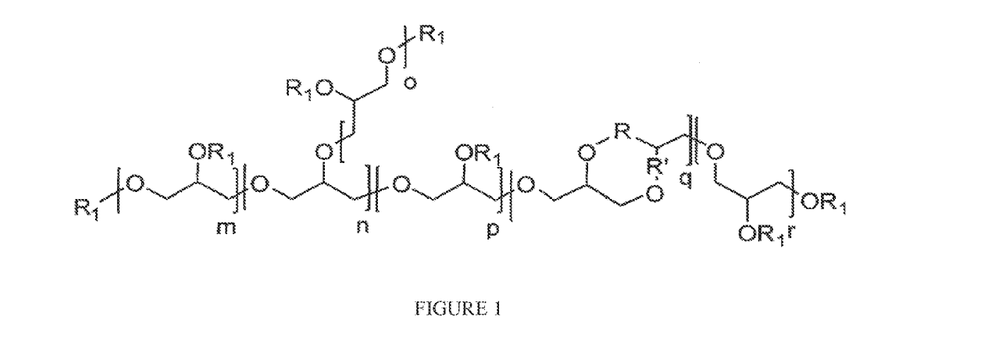
FIG. 1 is an illustration of a branched, cyclic glycerol-based polymer.

"Degree of branching" or DB means the mole fraction of monomer units at the base of a chain branching away from the main polymer chain relative to a perfectly branched dendrimer, determined by $^{13}C$ NMR based on a known literature method described in *Macromolecules*, 1999, 32, 4240. Cyclic units or branched alkyl chains derived from fatty alcohols or fatty acids are not included in the degree of branching. In a perfect dendrimer the DB is 1 (or 100%). FIG. 1 illustrates a compound with a DB of ⅐.

"Degree of cyclization" or DC means the mol fraction of cyclic structure units relative to the total monomer units in a polymer. The cyclic structure units can be formed by intramolecular cyclization of the polyols or any other ways to incorporate in the polyols. The cyclic structure units comprise basic structure units (V, VI and VII of FIG. 2) and the analogues thereof. The degree of cyclization may be determined by $^{13}C$ NMR.

"Glycerol-based polymers" refers to any polymers containing repeating glycerol monomer units such as polyglycerols, polyglycerol derivatives, and a polymer consisting of glycerol monomer units and at least another monomer units to other multiple monomers units regardless of the sequence of monomers unit arrangements. In embodiments, glycerol-based polymers include alkylated, branched, cyclic polyglycerol esters.

"Hyperbranched" means a polymer, which is highly branched with three-dimensional tree-like structures or dendritic architecture.

"Lipohydrophilic glycerol-based polymers" means glycerol-based polymers having lipophilic and hydrophilic functionalities, for example, lipohydrophilic polyglycerols resulting from lipophilic modification of polyglycerols (hydrophilic) in which at least a part of and up to all of the lipophilic character of the polymer results from a lipophilic carbon bearing group engaged to the polymer but not being an alkoxylate group, the lipophilic modification being one such as alkylation, and esterification modifications.

"Papermaking process" means a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. The papermaking process may also include a pulping stage, i.e. making pulp from a lignocellulosic raw material and bleaching stage, i.e. chemical treatment of the pulp for brightness improvement.

"Substituted" as used herein may mean that any at least one hydrogen on the designated atom or group is replaced with another group provided that the designated atom's normal valence is not exceeded. For example, when the substituent is oxo (i.e., =O), then two hydrogens on the atom are replaced. Combinations of substituents and/or variables are permissible provided that the substitutions do not significantly adversely affect synthesis or use of the compound.

1. Papermaking Processes

Disclosed herein are methods for controlling, i.e. reducing or eliminating the deposition of contaminants in a papermaking process, comprising adding a branched, cyclic glycerol-based polymer to a papermaking process, such as adding the polymer to pulp or to a papermaking system. The branched, cyclic glycerol-based polymer may be added to a papermaking process involving virgin pulp, recycled pulp or combination thereof at any one or more of various locations during the papermaking process. Suitable locations may include pulper, latency chest, reject refiner chest, disk filter or Decker feed or accept, whitewater system, pulp stock storage chests (either low density ("LD"), medium consistency (MC), or high consistency (HC)), blend chest, machine chest, headbox, saveall chest, paper machine whitewater system, and combinations thereof. The branched, cyclic glycerol-based polymer may be added to a pulp slurry in the papermaking process. The branched, cyclic glycerol-based polymer may also be applied to a surface in the papermaking process, such as a metal, plastic, or ceramic surfaces such as pipe walls, chest walls, machine wires, press rolls, felts, foils, Uhle boxes, dryers and any equipment surfaces that contact with fibers during the paper process. The method may include the step of contacting fibers with a branched, cyclic glycerol-based polymer. The fibers may be cellulose fibers, such as recycled fibers, virgin wood cellulose fibers, or combinations thereof.

In embodiments employing recycled fibers, the recycled fibers may be obtained from a variety of paper products or fiber containing products, such as paperboard, newsprint, printing grades, sanitary and other paper products. These products may comprise, for example, old corrugated containers (OCC), old newsprint (ONP), mixed office waste (MOW), old magazines and books, or combinations thereof. These types of paper products typically contain large amounts of hydrophobic contaminants. In embodiments employing virgin fibers, the method may involve the use of pulp derived from softwood, hardwood or blends thereof. Virgin pulp can include bleached or unbleached Kraft, sulfite pulp or other chemical pulps, and groundwood (GW) or other mechanical pulps such as, for example, thermomechanical pulp (TMP).

Examples of organic hydrophobic contaminants include what is known in the industry as "stickies" that may include synthetic polymers resulting from adhesives and the like, glues, hot melts, coatings, coating binders, pressure sensitive binders, unpulped wet strength resins and "pitch" that may include wood resins, rosin and resin acid salts. These types of materials are typically found in paper containing products, such as newsprint, corrugated container, and/or mixed office waste. These hydrophobic contaminants can have polymers present, such as styrene butadiene rubber, vinyl acrylate polymers, polyisoprene, polybutadiene, natural rubber, ethyl vinyl acetate polymers, polyvinyl acetates, ethylvinyl alcohol polymers, polyvinyl alcohols, styrene acrylate polymers, and/or other synthetic type polymers.

The method may control hydrophobic contaminants in papermaking processes, e.g., the deposition of hydrophobic contaminants on components of a papermaking process. For example, the method may control hydrophobic contaminants present in paper mill furnish. For example, the method may reduce, inhibit or eliminate the deposition of hydrophobic contaminants in a papermaking process. The method may also reduce the size of contaminant particles through dispersion and suppressing agglomeration, and/or reduce the tackiness of the hydrophobic contaminants when compared to a papermaking process in which a branched, cyclic glycerol-based polymer is not employed. For example, the method may reduce the average size of contaminant particles by at least about 5% to about 40% (e.g., about 5%, 6%, 7%, 8%, 9%, 10%, 15%, 20%, 25%, 30%, 35% or 40%) when compared to a papermaking process in which a branched, cyclic glycerol-based polymer is not employed. In embodiments, the method may reduce the deposition of hydrophobic contaminants by at least about 5% to about 95% (e.g., about 5%, 6%, 7%, 8%, 9%, 10%, 15%, 20%, 25%, 30%, 35%, 40%, 45%, 50%, 55%, 60%, 65%, 70%, 75%, 80%, 85%, 90% or 95%) when compared to a papermaking process in which a branched, cyclic glycerol-based polymer is not employed.

In the method, a glycerol based polymer may be added to a papermaking process in an amount effective to reduce deposition of hydrophobic contaminants when compared to a papermaking process in which a branched, cyclic glycerol-based polymer is not employed. For example, a glycerol based polymer may be added to pulp slurry in an amount from about 10 ppm to about 300 ppm, e.g., from about 50 ppm to about 200 ppm, or about 50 ppm, 60 ppm, 70 ppm, 80 ppm, 90 ppm, 100 ppm, 110 ppm, 120 ppm, 130 ppm, 140 ppm, 150 ppm, 160 ppm, 170 ppm, 180 ppm, 190 ppm, to about 200 ppm. The effective amount may reduce the deposition of hydrophobic contaminants by at least 5% to about 95% (e.g., about 5%, 6%, 7%, 8%, 9%, 10%, 15%, 20%, 25%, 30%, 35%, 40%, 45%, 50%, 55%, 60%, 65%, 70%, 75%, 80%, 85%, 90% or 95%) when compared to a papermaking process in which a branched, cyclic glycerol-based polymer is not employed. The method may further include adding to the papermaking system at least one component selected from the group consisting of fixatives, detackifiers and other dispersants.

2. Glycerol-Based polymers

The method for reducing the deposition of contaminants in a papermaking process, comprises adding a branched, cyclic glycerol-based polymer to a papermaking process. The branched, cyclic glycerol-based polymer may be any polymer containing repeating glycerol monomer units such as polyglycerols, polyglycerol derivatives, and polymers consisting of glycerol monomer units and at least one other monomer unit, regardless of the sequence of monomers unit arrangements. Suitably, other monomers may be polyols or hydrogen active compounds such as pentaerythrital, glycols, amines, etc. capable of reacting with glycerol or any polyglycerol structures.

In embodiments, the branched, cyclic glycerol-based polymer may be modified with a lipophilic group, e.g., alkylated or esterified. Without being limited as to theory, modification of a branched, cyclic glycerol-based polymer with one or more lipophilic groups may produce branched, cyclic glycerol-based polymers with an advantageous balance of lipophilic and hydrophilic moieties. The lipophilic groups may interact with hydrophobic contaminants in a papermaking process, e.g., in a pulp slurry. The hydrophilic portion may aid dispersing the hydrophilic contaminants in water. The lipophilic groups may be introduced via known methods such as alkylation, alkoxylation esterification, or combinations thereof.

In embodiments, at least one portion of the branched, cyclic glycerol-based polymer has both alkyl and ester functionalities. The nature of different polarities from both functionalities may be adjusted to optimally perform in dispersing pitch and stickies.

The glycerol-based polymer is typically branched. The branching structure in the backbone of the polymer, not in the lipophilic chains, may increase the polymer dimensions for the effective interfacial interactions to result in exceptional organic deposit control. Branching may be particularly useful as it facilitates increased molecular weight of the branched, cyclic glycerol-based polymers. Branched polymers include both hyperbranched and dendritic structures. The branched, cyclic glycerol-based polymer may have a degree of branching of at least about 0.10, e.g., from about 0.20 to about 0.75 or from about 0.30 to about 0.50. For example, a branched, cyclic glycerol-based polymer may have a degree of branching of about 0.10, about 0.15, about 0.20, about 0.25, about 0.30, about 0.35, about 0.40, about 0.45, about 0.50, about 0.55, about 0.60, about 0.65, about 0.70 or about 0.75.

The glycerol-based polymer is also typically cyclic, i.e. has at least one cyclic or ring structure. Such cyclic structures may be formed, for example, during the polymerization process via intramolecular cyclization reactions. The rigidity of cyclic structures in the polymer backbone may uniquely extend the molecular dimensions and increase the hydrodynamic volume, to better act interfacially for dispersing pitch and stickies. The branched, cyclic glycerol-based polymer may have a degree of cyclization of about 0.01 to about 0.50. For example, the branched, cyclic glycerol-based polymer may have a degree of cyclization of at least 0.01, e.g., about 0.02 to about 0.19 or about 0.05 to about 0.15. For example, a branched, cyclic glycerol-based polymer may have a degree of cyclization of about 0.01, about 0.02, about 0.03, about 0.04, about 0.05, about 0.06, about 0.07, about 0.08, about 0.09, about 0.10, about 0.11, about 0.12, about 0.13, about 0.14, about 0.15, about 0.16, about 0.17, about 0.18, or about 0.19.

Suitable branched, cyclic glycerol-based polymers include compounds as illustrated in FIG. 1. In the these compounds, m, n, o, p, q and r are independently 0 to 700; R and R' are independently $-(CH_2)_x-$, wherein each x is independently 0 or 1; and each $R_1$ is independently selected from hydrogen, acyl and alkyl. Furthermore, it should be understood that the compounds illustrated in FIG. 1 are random polymers of the indicated monomeric units. For example, in an exemplary embodiment in which m, n, o, p, q and r are each 1, it is understood that the monomeric units may be present in any order and not necessarily in the order illustrated in FIG. 1. In another exemplary embodiment in which m, n, o, p, q and r are each 2, it is understood that the monomeric units may be present in any order, where the two "m" units may or may not be adjacent to each other, the two "n" units may or may not be adjacent to each other, and so on.

In embodiments of the formula illustrated in FIG. 1, each m, n, o and p is independently 1-700, and each q and r is independently 0-700. In embodiments of the formula illustrated in FIG. 1, each m, n, o and q is independently 1-700, and each p and r is independently 0-700.

In embodiments of the formula illustrated in FIG. 1, each m, n, o, p, q and r is independently selected from 0 to 50, 0 to 40, 0 to 30 or 0 to 25. Suitably, each of m, n, o, p, q and r are independently selected from 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50 (or more).

In embodiments of the formula illustrated in FIG. 1, each $R_1$ is independently selected from hydrogen, acyl and $C_1$-$C_{50}$ alkyl. When $R_1$ is alkyl, it may be, for example, a $C_1$-$C_{50}$ alkyl, $C_1$-$C_{40}$ alkyl, $C_1$-$C_{30}$ alkyl, $C_1$-$C_{24}$ alkyl, $C_6$-$C_{18}$ alkyl, $C_{10}$-$C_{16}$ alkyl or $C_{12}$-$C_{14}$ alkyl group. For example, each $R_1$ that is alkyl may independently be a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ or $C_{24}$ alkyl group. The $R_1$ group may be optionally substituted with other hydrocarbon-based groups, such as branched, cyclic, saturated, unsaturated or unsaturated groups.

When $R_1$ is acyl, it may be, for example, a C1-C15 acyl group. When $R_1$ is acyl, it may be, for example, $-C(O)CH(OH)CH_3$ (lactate). In embodiments, lactate or lactic acid may be produced as a co-product during the synthesis of the branched, cyclic glycerol-based polymer, which may further react with the polymer.

Figure 2:
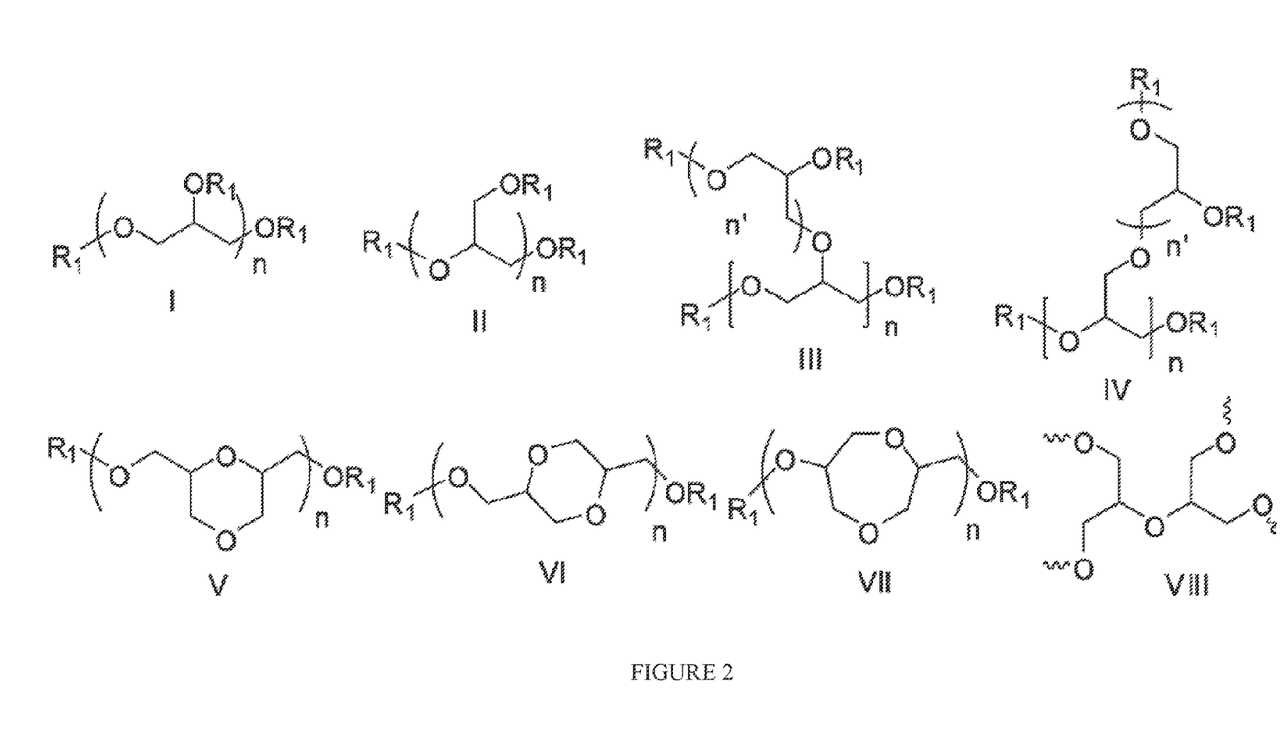
FIG. 2 is an illustration of basic structural units that may be present in the glycerol-based polymers.

In embodiments, the branched, cyclic glycerol-based polymer may comprise at least two repeating units selected from at least one of the structures listed in FIG. 2, including but not limited to linear structures I and II, branched structures III, IV and VIII, cyclic structures V, VI and VII, and any combination thereof. Any structure in FIG. 2 can be combined with any structure or structures including itself, in any order. The cyclic linkages of any basic cyclic structures in FIG. 2 may contain any structure or structures as a part or parts of linkages. In each of the repeating units depicted in FIG. 2, each $R_1$ is independently selected from hydrogen, acyl and alkyl, and each n and n' is independently 0 to 700.

In embodiments in which the branched, cyclic glycerol-based polymer is a lipohydrophilic glycerol-based polymer, it may be a polymer as illustrated in FIG. 1, wherein: m, n, o, p, q and r are independently 0 to 700; R and R' are independently $-(CH_2)_x-$, wherein each x is independently 0 or 1; and each $R_1$ is independently selected from hydrogen, acyl and alkyl, wherein at least $R_1$ is alkyl.

The branched, cyclic glycerol-based polymer may have a weight-average molecular weight of about 1000 Da to about 500000 Da, e.g., about 2000 Da to about 400000 Da, or about 3000 Da to about 300000 Da. For example, the branched, cyclic glycerol-based polymer may have a molecular weight of about 1000 Da, about 2000 Da, about 3000 Da, about 4000

Da, about 5000 Da, about 6000 Da, about 7000 Da, about 8000 Da, about 9000 Da, about 10000 Da, about 15000 Da, about 20000 Da, about 25000 Da, about 30000 Da, about 35000 Da, about 40000 Da, about 45000 Da, about 50000 Da, about 60000 Da, about 70000 Da, about 80000 Da, about 90000 Da, about 100000 Da, about 150000 Da, about 200000 Da, about 250000 Da, about 300000 Da, about 350000 Da, about 400000 Da, about 450000 Da, or about 500000 Da.

a. Cross-Linked Glycerol-Based Polymers

The branched, cyclic glycerol-based polymer may be crosslinked. In some embodiments the branched, cyclic glycerol-based polymer may self-crosslink, and in some embodiments the polymer may be crosslinked via addition of a crosslinking agent. Suitable crosslinking agents typically include at least two reactive groups such as double bonds, aldehydes, epoxides, halides, and the like. For example, a cross-linking agent may have at least two double bonds, a double bond and a reactive group, or two reactive groups. Non-limiting examples of such agents are diisocyanates, N,N-methylenebis(meth)acrylamide, polyethyleneglycol di(meth)acrylate, glycidyl(meth)acrylate, dialdehydes such as glyoxal, di- or tri-epoxy compounds such as glycerol diglycidyl ether and glycerol triglycidyl ether, dicarboxylic acids and anhydrides such as adipic acid, maleic acid, phthalic acid, maleic anhydride and succinic anhydride, phosphorus oxychloride, trimetaphosphates, dimethoxydimethsilane, tetraalkoxysilanes, 1,2-dichloroethane, 1,2-d ibromoethane, dichloroglycerols 2,4,6-trichloro-s-triazine and epichlorohydrin.

b. Methods of Preparing Glycerol-Based Polymers

The branched, cyclic glycerol-based polymer may be from a commercially available supplier, or synthesized according to known methods such as those described in U.S. Pat. Nos. 3,637,774, 5,198,532 and 6,765,082 B2, and in U.S. Patent Application Publication Nos. 2008/0306211 and 2011/0092743, or from any combination thereof.

For example, in embodiments, a method of preparing a branched, cyclic glycerol-based polymer may include the step of: reacting a reaction mass comprising at least glycerol monomer in the presence of a strong base catalyst of a concentration above 2%, in a low reactivity atmospheric environment at a temperature above 200° C., which produces a product comprising branched, cyclic polyols and a co-product comprising lactic acid, lactic salt, and any combination thereof. Such a method can further comprise the steps of providing a catalyst above 3%. The catalyst may be selected from the group consisting of: NaOH, KOH, CsOH, a base stronger than NaOH, and any combination thereof. The strong base catalyst in the particular amount can be used with combining a base weaker than NaOH. The atmospheric environment may be an atmospheric pressure of less than 760 mm Hg and/or may be a flow of an inert gas selected from the list of $N_2$, $CO_2$, He, other inert gases and any combination thereof and the flow is at a rate of 0.2 to 15 mol of inert gas per hour per mol of monomer. The particular atmospheric environment profile applied can be steady, gradual increase, gradual decrease or any combination thereof.

The method of preparing the branched, cyclic glycerol-based polymer may produce branched, cyclic glycerol-based polymer products selected from the group consisting of polyglycerols, polyglycerol derivatives, a polyol having both glycerol monomer units and non-glycerol monomer units and any combination thereof. The branched, cyclic glycerol-based polymer products have at least two hydroxyl groups. At least a portion of the produced polymers may have both at least a 0.1 degree of branching and at least a 0.01 degree of cyclization. The co-product may be at least 1% by weight.

The method of preparing the branched, cyclic glycerol-based polymer may make use of different forms of glycerol including pure, technical, crude, or any combination thereof. Such methods may further comprise other monomers selected from the group consisting of polyols such as pentaerythritol and glycols, amines, other monomers capable of reacting with glycerol or glycerol-based polyol intermediates and any combination thereof. The monomer(s) and/or catalyst(s) can be mixed at the very beginning of the reaction, at any time during the reaction and any combination thereof. The glycerol-based polyol products may be resistant to biological contamination for at least two years after synthesis. The method may further comprise the steps of pre-determining the desired molecular weight of the produced polyglycerol and adjusting the atmospheric environment to match the environment optimum for producing the desired molecular weight. The method may further comprise the steps of pre-determining the desired degree of branching and the desired degree of cyclization of the produced polyglycerol and the desired amount of co-product, and adjusting the atmospheric environment to match the environment optimum for producing the desired degree of branching, degree of cyclization and amount of co-product lactic acid and/or lactate salt.

A lipohydrophilic glycerol-based polymer may be produced from glycerol-based polymers, such as those that are commercially available or those described herein, according to known methods such as alkylation, esterification and any combinations thereof. For example, such polymers may be produced from glycerol-based polymers according to known methods such as alkylation, as described in German Patent Application No. 10307172, in Canadian Patent No. 2,613,704, in U.S. Pat. Nos. 3,637,774, 5,198,532, 6,228,416 and 6,765,082 B2, in U.S. Patent Application Publication Nos. 2008/0306211 and 2011/0220307, in Markova et al. *Polymer International*, 2003, 52, 1600-1604, and the like.

Glycerol-based polymers may be produced according to known methods such as esterification of glycerol-based polymers as described in U.S. Pat. No. 2,023,388, U.S. Patent Application Publication No. 2006/0286052 and the like. The esterification may be carried out with or without a catalyst such as acid(s) or base(s).

The crosslinked glycerol-based polymers may be produced in a continuous process under a low reactivity atmospheric environment according to a method described in U.S. patent application Ser. No. 13/484,526, filed on May 31, 2012. The method may comprise the steps of: a) reacting a reaction mass comprising at least glycerol monomer in the presence of a strong base catalyst of a concentration of above 2% at a temperature above 200 degrees C. which produces a first product comprising polyols which are both branched and cyclic, and a co-product comprising lactic acid, lactic salt, and any combination thereof, b) esterifying the first product in presence of an acid catalyst of a concentration above 5% at a temperature above 115 degrees C. to produce a second product, c) alkylating the second product at a temperature above 115 degrees C. to form a third product, and d) crosslinking the third product at a temperature above 115 degrees C. to form an end product.

The invention encompasses any and all possible combinations of some or all of the various embodiments described herein. Any and all patents, patent applications, scientific papers, and other references cited in this application, as well as any references cited therein, are hereby incorporated by reference in their entirety.

EXAMPLE 1

Synthesis of a Glycerol-Based Polymer

Step 1:

100 Units (or using different amounts) of glycerol were added to a reaction vessel followed by 3.0 to 4.0% of active NaOH relative to the reaction mixture. This mixture was agitated and then gradually heated up to 240° C. under a particular low reactivity atmospheric environment of nitrogen flow rate of 0.2 to 4 mol of nitrogen gas per hour per mol of monomer. This temperature was sustained for at least three hours to achieve the desired polyglycerol composition, while being agitated under a particular low reactivity atmospheric environment. An in-process polyglycerol sample was drawn before next step for the molecular weight/composition analysis/performance test. The analysis of polyglycerols (PG) is summarized in Table 1.

Step 2:

To PG2 (Table 1) from step 1 were added lauryl alcohol (10% relative to PG2), sulfuric acid (2%) and p-toluenesulfonic acid (2%) at 100° C. while agitating under nitrogen atmosphere. The mixture was gradually heated up to 150° C. and kept there for 8 hours under a nitrogen flow. After cooling down, the product was dissolved in water as 50% solid (Table 2, Product 2).

TABLE 1

| Polyglycerols in neat | Weight average MW* | Number average MW* | Polydispersity* | lactic acid weight by NMR** | Degree of branching** |
|---|---|---|---|---|---|
| Product 1 (or PG1) | 6,700 | 2,000 | 3.3 | 20% | 0.35 |
| PG2 | 6,100 | 1,900 | 3.3 | 15% | 0.32 |
| PG3 | 7,800 | 2,000 | 3.8 | 14% | 0.34 |
| PG4 | 3,800 | 1,600 | 2.3 | 10% | 0.31 |
| PG5 | 3,900 | 1,700 | 2.3 | 12% | 0.31 |
| PG6 | 8,600 | 2,100 | 4.0 | 12% | 0.35 |

Note:
*Determined by borate aqueous SEC (size exclusion chromatography) method and calibrated with PEO/PEG standards;
**determined by $^{13}C$ NMR which is consistent with HPLC results.

EXAMPLE 2

Synthesis of a Cross-Linked Glycerol-Based Polymer

After cooling down, to a PG from the step 1 of Example 1 (Table 1, PG3 to PG6) was added sulfuric acid (10 to 22%). The mixture was again gradually heated up to 130° C.-150° C. and kept there for at least 30 minutes under a particular low reactivity atmospheric environment of nitrogen flow rate of 0.2 to 4 mol of nitrogen gas per hour per mol of monomer, to achieve the desired esterification. A 10 to 15% amount of C6-C16 alcohols was then added, and the mixture was heated up to 150° C. and kept there under a particular low reactivity atmospheric environment for at least 30 minutes to achieve the desired alkylation. The resulting reaction mixture was stirred at 150° C. under a particular low reactivity atmospheric environment for at least 30 minutes to achieve the crosslinking to produce the desired end product. After cooling down, the product was dissolved in water in as 50% solid, and directly used with or without after pH adjustment (Table 2, Product 3 to Product 6). During the whole process in-process samples were drawn every 30 minutes to 2 hours as needed to monitor the reaction progress in each step and determine the composition as needed.

TABLE 2

Glycerol-based polymer surface active products

| Products in 50% | Polyglycerol used | Alcohols used | Weight average MW* | Number average MW* | Polydispersity* | lactic acid by HPLC** |
|---|---|---|---|---|---|---|
| Product 2 | PG2 | lauryl alcohol | 7,200 | 1,400 | 5.0 | 5.20% |
| Product 3 | PG3 | C10-C16 alcohols | 18,000 | 2,400 | 7.6 | 0.56% |
| Product 4 | PG4 | C10-C16 alcohols | 21,000 | 3000 | 7.3 | — |
| Product 5 | PG5 | 1-hexanol | 24,000 | 3,300 | 7.4 | — |
| Product 6 | PG6 | C10-C16 alcohols | 17,000 | 2,000 | 8.6 | 1.66% |

Note:
*determined by SEC method using PLgel Guard Mixed-D column and DMSO as mobile phase, and calibrated with polysaccharide standards;
**measured by HPLC external standard quantification and calibrated with lactic acid standard.

EXAMPLE 3

Performance Tests

Performance testing was carried out as model pitch tests, based on the deposition of synthetic softwood pitch induced by calcium ions and mild acidification and as an on-line stickies test in an actual mill.

Model Test 1.

1000 mL 0.5% softwood Kraft pulp slurry, which pH was adjusted to 10.6, was placed in an SRM-3 instrument cell and mixed with a glycerol-based polymer (5 min), followed by addition of 100 mL of a 1% solution of synthetic softwood pitch Nalco TX-6226 in isopropanol. Upon homogenization, 5 ml of 5000 ppm (as $Ca^{2+}$ ion) solution of calcium chloride was added and the pH was adjusted to 3.5 with 5N hydrochloric acid. The deposit accumulation was then recorded.

Model Test 2.

15 L of 0.4% pulp slurry (Kraft softwood) at pH 10.6 was prepared at room temperature and used as a stock sample. In each test, 1 L of the stock sample was placed in an SRM-3 cell under continuous stirring (magnetic, 300 rpm). When needed, the tested chemical was added (100 ppm as product; II ml of aqueous solution 1:100). The recording started, and upon equilibration (flat baseline), 100 ml 1% solution of synthetic pitch (Nalco TX-6226) in isopropanol added. The pH dropped to 8.5, and slow accumulation of a water-insoluble colloidal component was recorded for approx. 10 min. Then 4 ml 10% solution of calcium chloride dihydrate (100 ppm) was added and deposition of calcium salts was recorded at pH 8.1 for approx. 20 min (Stage 1). Then the pH was adjusted to 3.5 with a few drops of 10% HCl and deposition of free acids and calcium salts recorded under acidic conditions (Stage 2). The data clearly demonstrate the effect of new chemistries at the first (calcium only) and second (upon acidification) stages of the test.

Mill test. A DRM-II on-line instrument was used that allowed recording continuous deposition from the same stream with and without (Blank) chemical feed (headbox, 1% consistency, recycled board mill).

The glycerol-based polymers were compared to two current commercial products. Comparison 1 is a solution of an ethoxylated fatty amide with EDTA and an alkyl aryl sulfonate. Comparison 2 is a cyanoguanidine condensation polymer (dicyandiamide-urea-formaldehyde resin).

Figure 3:
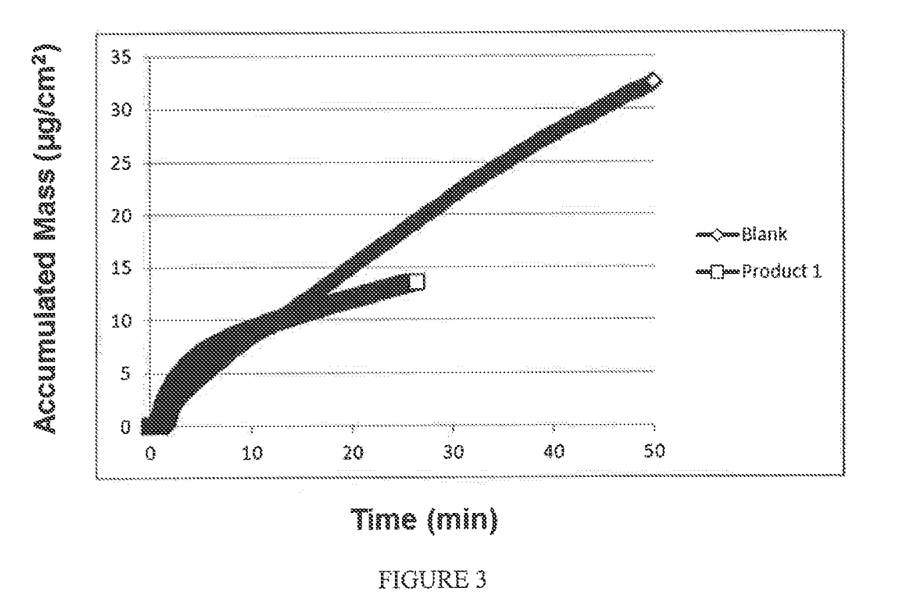
FIG. 3 illustrates pitch deposition data in Model Test 2, for a branched, cyclic glycerol-based polymer compared to a control.

Results are illustrated in FIGS. 3-7. FIG. 3 shows results from Model test 2, as a graph of the accumulated mass (μg/cm$^2$) vs. time (min). Blank=no chemistry. Product 1=PG1 from Table 2 at 100 ppm.

Figure 4:
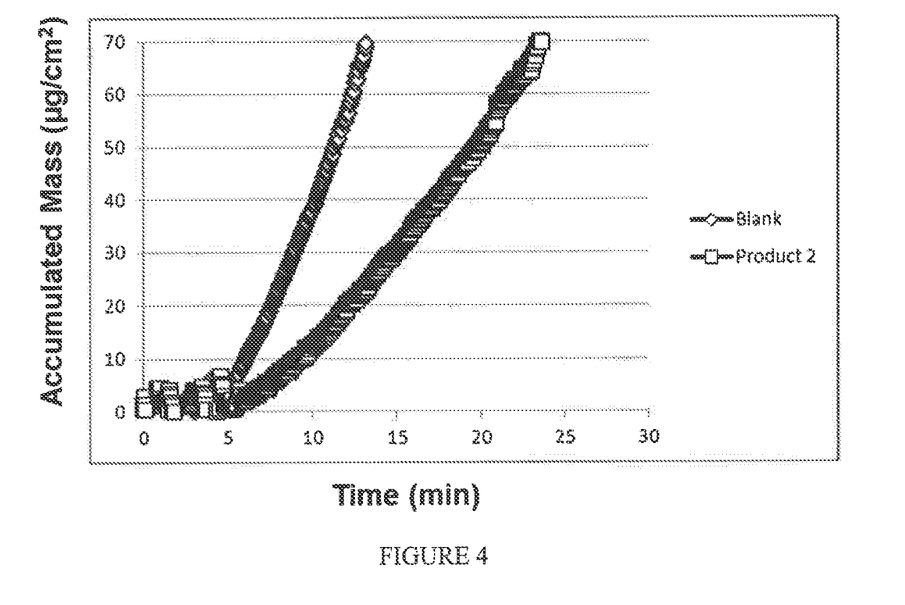
FIG. 4 illustrates pitch deposition data in Model Test 1, for a branched, cyclic glycerol-based polymer compared to a control.

FIG. 4 shows results from Model test 1, as a graph of the accumulated mass (μg/cm$^2$) vs. time (min). Blank=no chemistry. Product 2 (Table 2) at 100 ppm.

Figure 5:
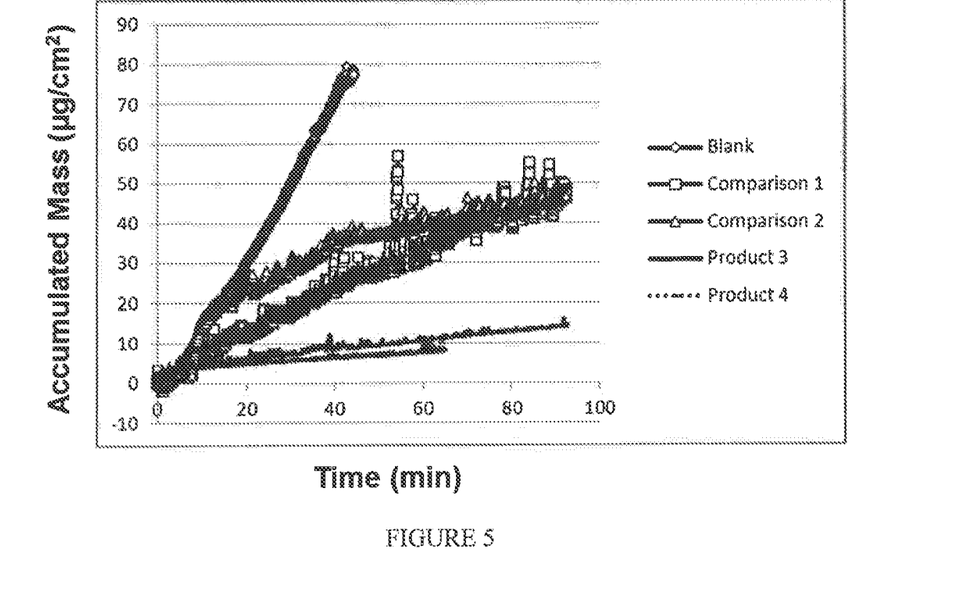
FIG. 5 illustrates pitch deposition data in Model Test 1, for two branched, cyclic glycerol-based polymers compared to currently available products and a control.

FIG. 5 shows results from Model test 1, as a graph of the accumulated mass (μg/cm$^2$) vs. time (min). Blank=no chemistry. Comparisons 1 and 2 at 300 ppm. Products 3 and 4 (Table 2) at 100 ppm.

Figure 6:
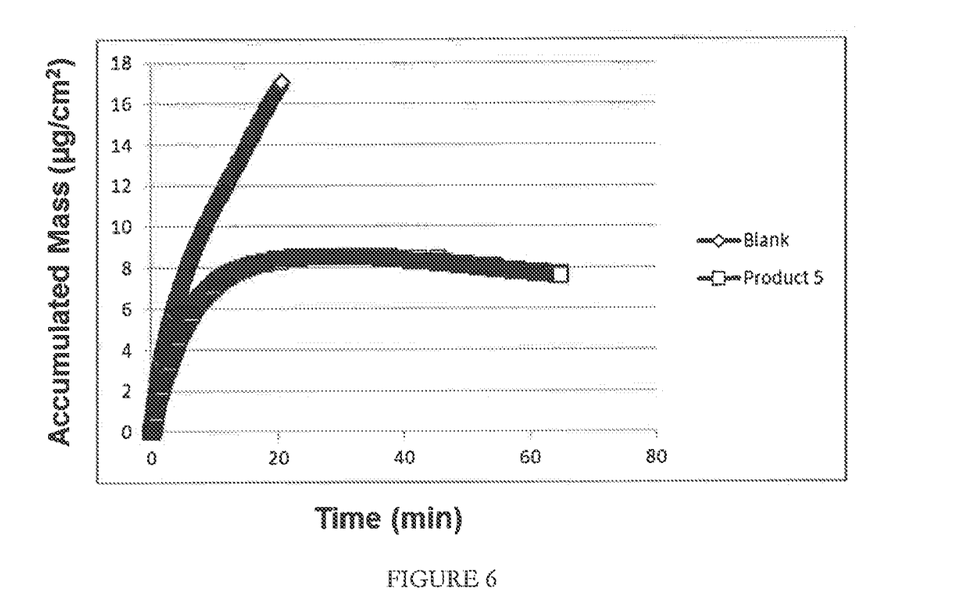
FIG. 6 illustrates pitch deposition data in Model Test 2, for a branched, cyclic glycerol-based polymer compared to a control.

FIG. 6 shows results from Model test 2 (Stage 2), as a graph of the accumulated mass (μg/cm$^2$) vs. time (min). Blank=no chemistry. Product 5 (Table 2) at 100 ppm.

Figure 7:
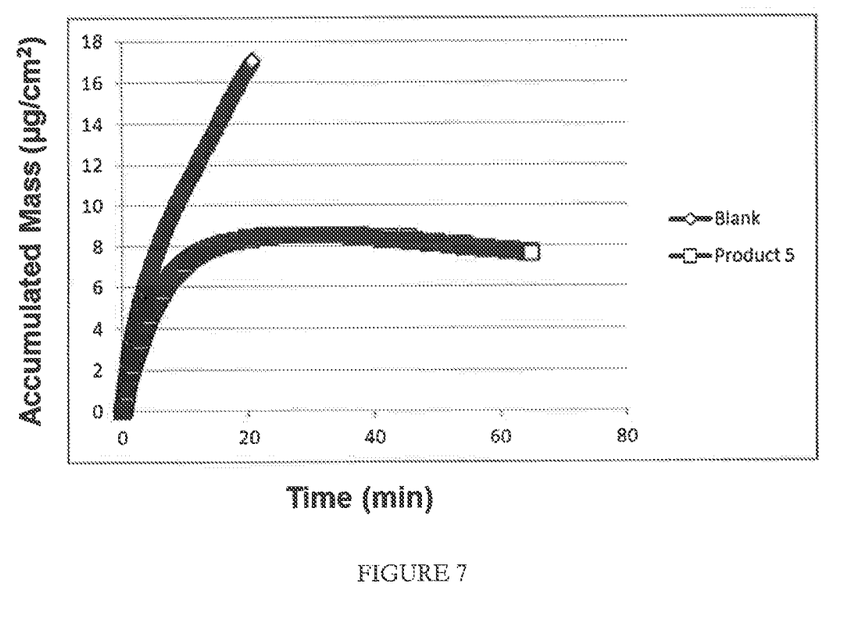
FIG. 7 illustrates stickies deposition data in Mill Test, for a branched, cyclic glycerol-based polymer compared to a control.

FIG. 7 shows results from a Mill test of Product 6 (Table 2) at 100 ppm, in actual 1% recycled pulp flow vs. untreated stream.

Based on the test results, the branched cyclic polyglycerol (Table 1, Product 1 or PG1) shows reduced pitch deposition compared to the control (FIG. 3), and the Product 2 from alkylation of PG2 with lauryl alcohol appears to perform better than PG1. Furthermore, the crosslinked, branched, cyclic glycerol-based polymer products having both alkyl and ester functionalities perform well in comparison with current products and un-crosslinked products (Tables 1 and 2, and FIGS. 3 to 5). Additionally, the crosslinked Product 5, alkylated with a lower hydrocarbon chain alcohol (C6), performs organic deposit control well (Table 2, and FIG. 6). In a field evaluation of a recycled mill, the crosslinked Product 6 performs deposition control well, which demonstrates that the chemistry works well for reducing stickies deposition.

SRM-3 and DRM-II are Nalco proprietary instruments based on the quartz crystal microbalance technology, which use the same sensors but different experimental setups and, electronic controllers (Appita, 2011, 64, 25-29). They can be best described as sensitive microcoupons that record mass deposition continuously either in a benchtop batch experiment (SRM-3) or on-line (DRM-II). In a series of benchtop tests the samples are tested consecutively—first, blank, then slurries containing the products. In an on-line experiment, the blank and treated stream are recorded simultaneously—the DRM-II instrument collects data from two sensors sidestream, and the product is fed after the first sensor to a mixing system before the second sensor in the same stream.

The invention claimed is:

1. A method of reducing the deposition of organic contaminants during a pulp processing stage of a papermaking process, comprising adding to pulp or a papermaking system an effective amount of a branched, cyclic glycerol-based polymer, wherein the branched, cyclic glycerol-based polymer is cross-linked.

2. The method of claim 1, wherein the branched, cyclic glycerol-based polymer is a lipohydrophilic glycerol based polymer.

3. The method of claim 1, wherein the branched, cyclic glycerol-based polymer is a random polymer of the monomeric units indicated in the following formula:

wherein:
m, n, o, p, q and r are independently 0 to 700;
R and R' are independently —(CH$_2$)$_x$—, wherein each x is independently 0 or 1; and
each R$_1$ is independently selected from hydrogen, acyl and C$_1$-C$_{50}$ alkyl.

4. The method of claim 3, wherein each R$_1$ is independently selected from hydrogen, C$_6$-C$_{18}$ alkyl, and —C(O)CH(OH)CH$_3$.

5. The method of claim 3, wherein each R$_1$ is independently selected from hydrogen, C$_{10}$-C$_{16}$ alkyl, and —C(O)CH(OH)CH$_3$.

6. The method of claim 3, wherein m, n, o, p, q and r are independently selected from 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50.

7. The method of claim 1, wherein the branched, cyclic glycerol-based polymer has a weight-average molecular weight of about 1,000 Da to about 500,000 Da.

8. The method of claim 1, further comprising adding to the pulp or the papermaking system at least one component selected from the group consisting of fixatives, detackifiers, and other dispersants.

9. The method of claim 1, wherein the contaminants are hydrophobic contaminants.

10. The method of claim 9, wherein the hydrophobic contaminants are stickies.

11. The method of claim 9, wherein the hydrophobic contaminants are pitch.

12. The method of claim 1, wherein the branched, cyclic glycerol-based polymer is added to a pulp slurry in a pulper, latency chest, reject refiner chest, disk filter or Decker feed or accept, whitewater system, pulp stock storage chest, blend chest, machine chest, headbox, saveall chest, or any combination thereof in the papermaking process.

13. The method of claim 1, wherein the branched, cyclic glycerol-based polymer is added to a surface in the papermaking process selected from a pipe wall, a chest wall, a machine wire, a press roll, a felt, a foil, an Uhle box, a dryer, or any combination thereof.

14. The method of claim 1, wherein the branched, cyclic glycerol-based polymer is added to a pulp slurry in the papermaking process.

15. The method of claim 14, wherein the effective amount of the branched, cyclic glycerol-based polymer is from about 5 ppm to about 300 ppm based on the amount of pulp slurry.

16. The method of claim 15, wherein the effective amount of the branched, cyclic glycerol-based polymer is from about 50 ppm to about 200 ppm based on the amount of pulp slurry.

17. The method of claim 16, wherein the effective amount of the branched, cyclic glycerol-based polymer is about 100 ppm based on the amount of pulp slurry.

18. A method of reducing the deposition of organic contaminants in a papermaking process, comprising adding to pulp or a papermaking system a branched, cyclic glycerol-based polymer at an amount 5 ppm or above based on the amount of pulp slurry, wherein the branched, cyclic glycerol-based polymer is cross-linked.

\* \* \* \* \*